United States Patent [19]

Hackel et al.

[11] Patent Number: 5,239,408
[45] Date of Patent: Aug. 24, 1993

[54] HIGH POWER, HIGH BEAM QUALITY REGENERATIVE AMPLIFIER

[75] Inventors: Lloyd A. Hackel; Clifford B. Dane, both of Livermore, Calif.

[73] Assignee: Regents of the University of California, Oakland, Calif.

[21] Appl. No.: 948,488

[22] Filed: Sep. 22, 1992

Related U.S. Application Data

[63] Continuation-in-part of Ser. No. 822,763, Jan. 21, 1992.
[51] Int. Cl.⁵ .................. H01S 3/98; H01S 3/093
[52] U.S. Cl. .................... 359/338; 359/348; 372/30; 372/94
[58] Field of Search .......... 359/338, 346, 348; 372/20, 30, 94

[56] References Cited

U.S. PATENT DOCUMENTS

| | | | |
|---|---|---|---|
| 4,191,928 | 3/1980 | Emmett | 372/94 |
| 4,725,787 | 2/1988 | Chandra | 359/348 |
| 4,943,782 | 7/1990 | Stephens et al. | 359/338 |
| 4,989,216 | 1/1991 | Chandra et al. | 372/97 |
| 5,022,033 | 6/1991 | Hackell | 372/94 |

OTHER PUBLICATIONS

Manes et al; Proceedings of the Laser Materials Processing; Nov,. 9, 1990 LIA, vol. 71, pp. 100–122; Abst. only provided.
(B) Ledneva et al; J. Appl. Spectrosc., vol. 36, #3, pp. 299–303, Mar. 1982, Abst only provided.
Dane et al; Proc. of SPIE, vol. 1626, pp. 297–307, Abst. only provided herewith.
Hachel et al.; DOE Conf. on Laser and Electro-Optic., May 25, 1990, 2 pages; Abst. only supplied.
Armandillo, E.; Regenerative Amplification In A XeCl Excimer Laser With A Phase-Conjugating Brillouin Mirror; Optics Communications, vol. 49, No. 3, Mar. 1, 1984, pp. 198–200.
Park et al.; Electronic Linewidth Narrowing Method For Single Axial Mode Operation Of Q-Switched Nd:YAG Lasers; Optics Communications, vol. 37, No. 6, Jun. 15, 1981, pp. 411–416.
Pashinin, et al.; Regenerative YAG:Nd³⁺ Amplifier With A Stimulated Brillouin Scattering Mirror; Sov. J. Quantum Electron., 18 (9), Sep. 1988, pp. 1092–1094.
Summers, et al.; Design and Performance Of A High Average Power Zigzag Slab Laser; Amosa (Optical Society of America); 1989 Annual Meeting, Technical Digest, Oct. 15–20 1989, p. 230.
Weaver, et al.; Multikilowatt Pockels Cell For High Average Power Laser Systems, J. Appl. Phys. 68 (6), Sep. 15, 1990 pp. 2589–2598.
Yan, et al.; High-Repetition-Rate Nd:Phosphate Glass Regenerative Amplifier, Conference on Lasers and Electro-Optics, Apr. 26, to May 1, 1987, OSA/IEEE, Digest of Technical Papers, pp. 150–151.

*Primary Examiner*—Nelson Moskowitz
*Attorney, Agent, or Firm*—Henry P. Sartorio

[57] ABSTRACT

A regenerative laser amplifier system generates high peak power and high energy per pulse output beams enabling generation of X-rays used in X-ray lithography for manufacturing integrated circuits. The laser amplifier includes a ring shaped optical path with a limited number of components including a polarizer, a passive 90 degree phase rotator, a plurality of mirrors, a relay telescope, and a gain medium, the components being placed close to the image plane of the relay telescope to reduce diffraction or phase perturbations in order to limit high peak intensity spiking. In the ring, the beam makes two passes through the gain medium for each transit of the optical path to increase the amplifier gain to loss ratio. A beam input into the ring makes two passes around the ring, is diverted into an SBS phase conjugator and proceeds out of the SBS phase conjugator back through the ring in an equal but opposite direction for two passes, further reducing phase perturbations. A master oscillator inputs the beam through an isolation cell (Faraday or Pockels) which transmits the beam into the ring without polarization rotation. The isolation cell rotates polarization only in beams proceeding out of the ring to direct the beams out of the amplifier. The diffraction limited quality of the input beam is preserved in the amplifier so that a high power output beam having nearly the same diffraction limited quality is produced.

26 Claims, 4 Drawing Sheets

HIGH POWER, HIGH BEAM QUALITY REGENERATIVE AMPLIFIER

The United States government has rights in this invention pursuant to Contract Number W-7405-ENG-48 between the United States Department of Energy and the University of California for the operation of Lawrence Livermore National Laboratory.

CROSS-REFERENCE TO RELATED APPLICATION

This application is a continuation-in-part of U.S. patent application entitled HIGH POWER REGENERATIVE LASER AMPLIFIER, Ser. No. 07/822,763, filed Jan. 21, 1992, invented by Hackel, et al., which is incorporated herein by reference. Applicant claims priority from said application pursuant to 37 C.F.R. §1.78.

BACKGROUND

1. Field of the Invention

The present invention relates to laser amplifiers, and particularly to laser amplifiers generating high peak power and high energy per pulse output beams, e.g., for generating X-rays used in the process of X-ray lithography for manufacturing of integrated circuits.

2. Description of Related Art

High power laser amplifiers have a wide variety of applications. One important example is in the generation of X-rays used for X-ray lithography in the manufacture of integrated circuits. To generate X-rays, 1-20 nanosecond pulses of infrared radiation of about 20 joules per pulse with peak powers over a gigawatt are needed. Also, these pulses must be generated from five to ten times per second to achieve sufficient performance for cost effective production of integrated circuits. These high power infrared pulses are directed onto a tape impregnated with an iron oxide, which generates an X-ray in response to the stimulation of the infrared pulse. The X-rays are then used to illuminate resist coated wafers in the X-ray lithography process producing integrated circuits.

The design of laser amplifiers which can achieve these performance goals has been limited in the prior art by a variety of factors related to the tolerance of optical components in the amplifier to pulses of high energy laser light.

For instance, in one large class of amplifier designs, known as regenerative amplifiers, multiple passes through a single gain medium, or plural gain media, are used for efficient extraction of energy. In these regenerative amplifiers, an optical path is defined around which an input pulse transits a number of times.

The efficient extraction of energy from the gain medium is limited, however, by losses in optical components in the path, such as electro-optic switches, polarizers, and the like. For amplifiers which involve numerous transits of the optical path, a small loss in a single component can decrease the gain to loss ratio of the amplifier significantly.

Furthermore, the optical components typically have peak power damage thresholds. Perturbations or diffraction in the beam as the beam transits the optical path can cause the beam to exceed these peak power damage thresholds. This results in damage to the optics and loss in efficiency in the regenerative amplifier.

Another limitation in these multipass systems resides in average power thresholds of optical components in the optical path. For systems which involve a number of transits of the optical path and repetitive pulsed operation, the average power dissipated in a given optical element can be quite high.

Figure 1:
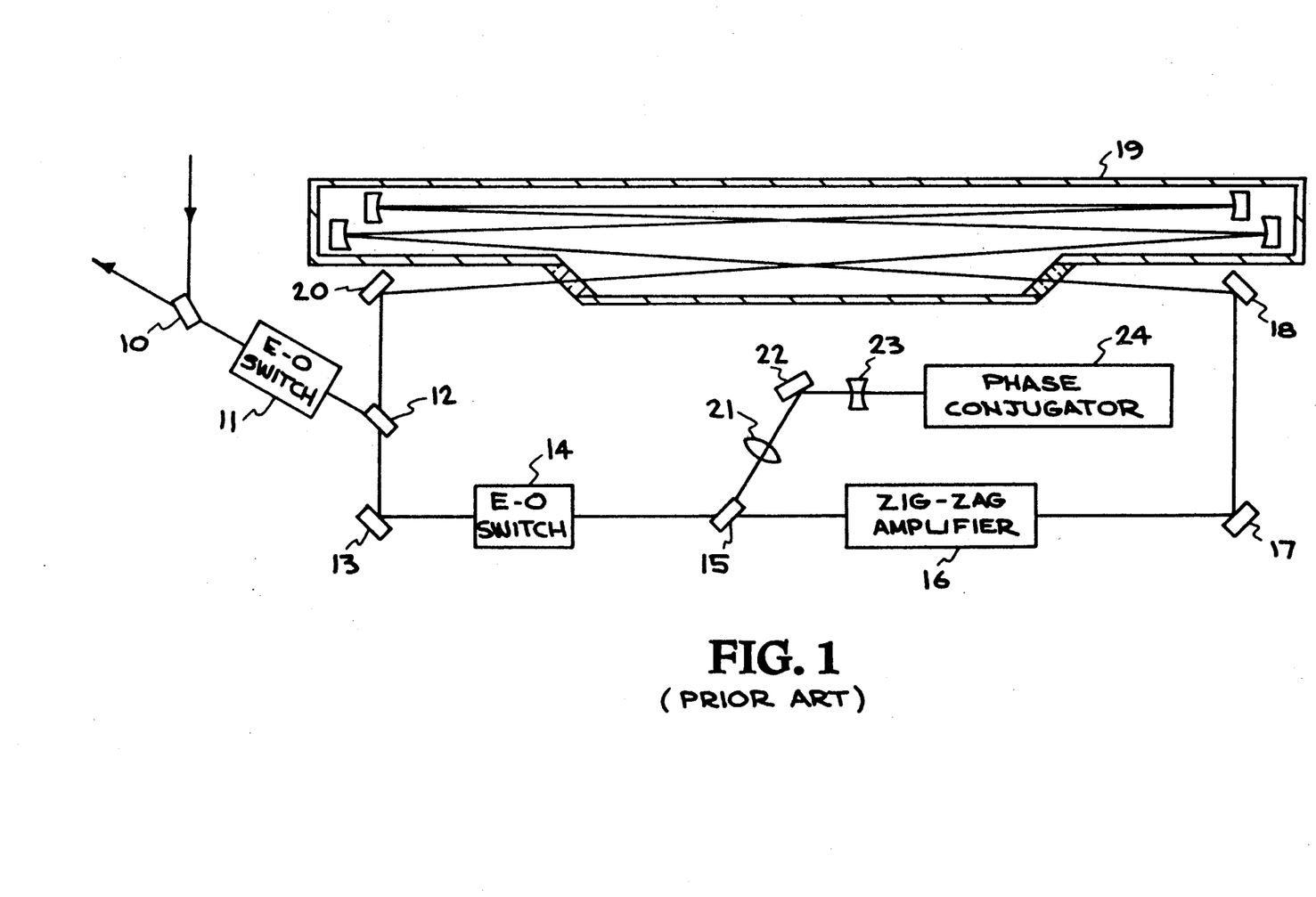
FIG. 1 is a schematic diagram of a prior art regenerative laser amplifier system.

A representative regenerative amplifier design of the prior art is shown in FIG. 1, which is a schematic diagram of a high average power amplifier described by Summers, et al., "Design Performance of a High Average Power Zig-Zag Slab Laser", Optical Society of America, 1989 Annual Meeting in Orlando, Fla.

The amplifier design of FIG. 1 includes a first polarizer 10, a first electro-optic switch or Pockels cell 11, a second polarizer 12, a first mirror 13, a second Pockels cell 14, a third polarizer 15, a zig-zag amplifier 16, a second mirror 17, a third mirror 18, an anamorphic vacuum relay (telescope) 19, and a fourth mirror 20. Also, a lense 21, fifth mirror 22, lense 23, and phase conjugator 24 are included in the amplifier system.

In operation, an input pulse is supplied incident on the first polarizer 10, and having a polarization which is reflected by the polarizer 10. This input beam passes through the first Pockels cell 11 without rotation, and is reflected by the second polarizer 12 into a ring shaped optical path. From the second polarizer 12, the pulse proceeds to mirror 13 and Pockels cell 14, where it is rotated to a polarization which is transmitted by the third polarizer 15. It then proceeds through the zig-zag amplifier 16, mirror 17, mirror 18, telescope 19, mirror 20, through second polarizer 12, to mirror 13, and through the Pockels cell 14 without rotation. Thus, the pulse is captured within the ring for a number of passes to achieve high gain. After one or more passes through the amplifier 16, the Pockels cell 14 causes the pulse to rotate so that it is reflected by third polarizer 15 into the phase conjugation leg of the amplifier. When it returns from the phase conjugator 24, it is again reflected by third polarizer 15 and supplied through Pockels cell 14 where it is rotated back to the polarization transmitted by the polarizers. It is then captured within the ring proceeding in the opposite direction for one or more passes through the amplifier. To couple the pulse out of the ring, the Pockels cell 14 rotates the pulse proceeding from third polarizer 15 toward mirror 13 so that it is reflected by second polarizer 12 through Pockels cell 11. Pockels cell 11 rotates the pulse so that it is transmitted by first polarizer 10 and supplied as an output beam.

This amplifier design demonstrates many of the limitations of the prior art. As can be seen, each pass through the amplifier 16 in which gain is achieved also involves a pass through a number of elements which can cause significant loss, including the telescope 19, the polarizers 12 and 15, and the electro-optic switch, implemented by the second Pockels cell 14.

Also, each of these elements is sensitive to perturbations in the beam. To limit the damage caused by perturbations, the relay telescope 19 relays an image near the amplifier 16 back onto itself. However, mirrors of the relay telescope 19 are far from the image plane, and thus diffraction of the beam in propagating from the plane results in intensity spiking and limited power.

Because of the above listed limitations, the amplifier design of FIG. 1 is impractical to use for producing the energy per pulse and peak power required in production of integrated circuits using X-rays, and for a variety of other applications. Accordingly, it is desirable to provide an amplifier design overcoming these prior art limitations.

SUMMARY OF THE INVENTION

Thus, it is desirable to reduce the amount of diffraction or phase perturbations in the output of the amplifier system to limit high peak intensity spiking. It is also desirable to provide an amplifier system capable of operating to enable efficient generation of X-rays for X-ray lithography.

The present invention provides an amplifier system which includes a ring shaped optical path with a limited number of components. The optical path includes an internal polarizer, a passive 90 degree phase rotator, a plurality of mirrors, a relay telescope, and a slab shaped gain medium. For inputting and outputting a pulse, the amplifier further includes a master oscillator, an external polarizer, and a one-way isolation rotator. The amplifier further includes a phase conjugator to enable reduction of phase aberrations.

In operation, a signal is input into the system at the external polarizer by a master oscillator which generates a beam with a polarization causing the beam to reflect off of the external polarizer. The beam will then proceed from the external polarizer through the isolation rotator, with no polarization change to enter the ring through the internal polarizer.

The pulse input into the ring shaped optical path is reflected by the internal polarizer and proceeds through a passive 90 degree phase rotator where polarization is rotated. The pulse then proceeds from the 90 degree phase rotator through first and second mirrors to a relay telescope. From the telescope, the beam proceeds through a third mirror into a gain medium, or slab where it is reflected by fourth and fifth mirrors back through the slab. From the slab, the beam is reflected off a sixth mirror back through the telescope and off a seventh mirror where it is reflected into the internal polarizer, thus completing one path around the ring.

The beam now having a polarization to pass through the internal polarizer will proceed for a second pass through the ring as described above. In the second pass, polarization rotation by the 90 degree rotator causes the beam to reflect off the internal polarizer into a stimulated Brillouin scattering (SBS) phase conjugator. The beam proceeding back out of the phase conjugator will also be reflected by the internal polarizer to proceed around the ring twice in the opposite direction.

After two passes around the ring in the opposite direction, polarization rotation by the 90 degree rotator causes the beam to reflect off of the internal polarizer out of the ring into the isolation rotator, e.g., Pockels cell. The isolation rotator rotates the polarization of the outgoing beam so that the beam will be output by the external polarizer.

The components of the present invention and their configuration as described above achieve reduced intensity spiking from diffraction and phase perturbations by first utilizing two paths around a ring shaped optical path before entering the SBS phase conjugator and two equal paths around the ring in the opposite direction but with reversed phase after exiting the SBS phase conjugator. The phase reversal and subsequent propagation through the amplifier results in essentially zero net phase aberration in the output beam.

Further, the Pockets cell is removed from the ring and replaced by a passive phase shifter so that no switching in the ring is required. A typical Pockels cell has approximately fourteen surfaces and will create more diffraction or phase perturbations than a two surface passive phase shifter. Also, with a passive phase shifter in the ring, the length of an input pulse may be as long as four times the distance of one transit of the ring. Also, with a passive phase shifter in the ring and a Faraday rotator replacing the input/output Pockels cell, no active switching is required and any length pulse can be amplified.

Another advantage of the amplifier configuration of the present invention is the placement of components near the telescope which involves, in effect, two relay telescopes. Use of the telescope of the present invention reduces diffraction caused by the significant distances between mirrors in the telescope of FIG. 1. Also, there are at least two passes through the slab for each transit of the optical path improving the gain to loss ratio of the ring.

Because of the combination of passive rotator and reflection (here by the phase conjugator) no Pockels cell switch is needed inside the ring. The configuration of components in the system allows the Pockets cell outside the ring to be an isolation Pockels cell which changes the beam phase as the beam passes through the Pockels cell in the direction only. Also, a passive Faraday rotator can be used.

BRIEF DESCRIPTION OF THE DRAWINGS

Further details of the present invention are explained with the help of the attached drawings in which.

DETAILED DESCRIPTION

Figure 2:
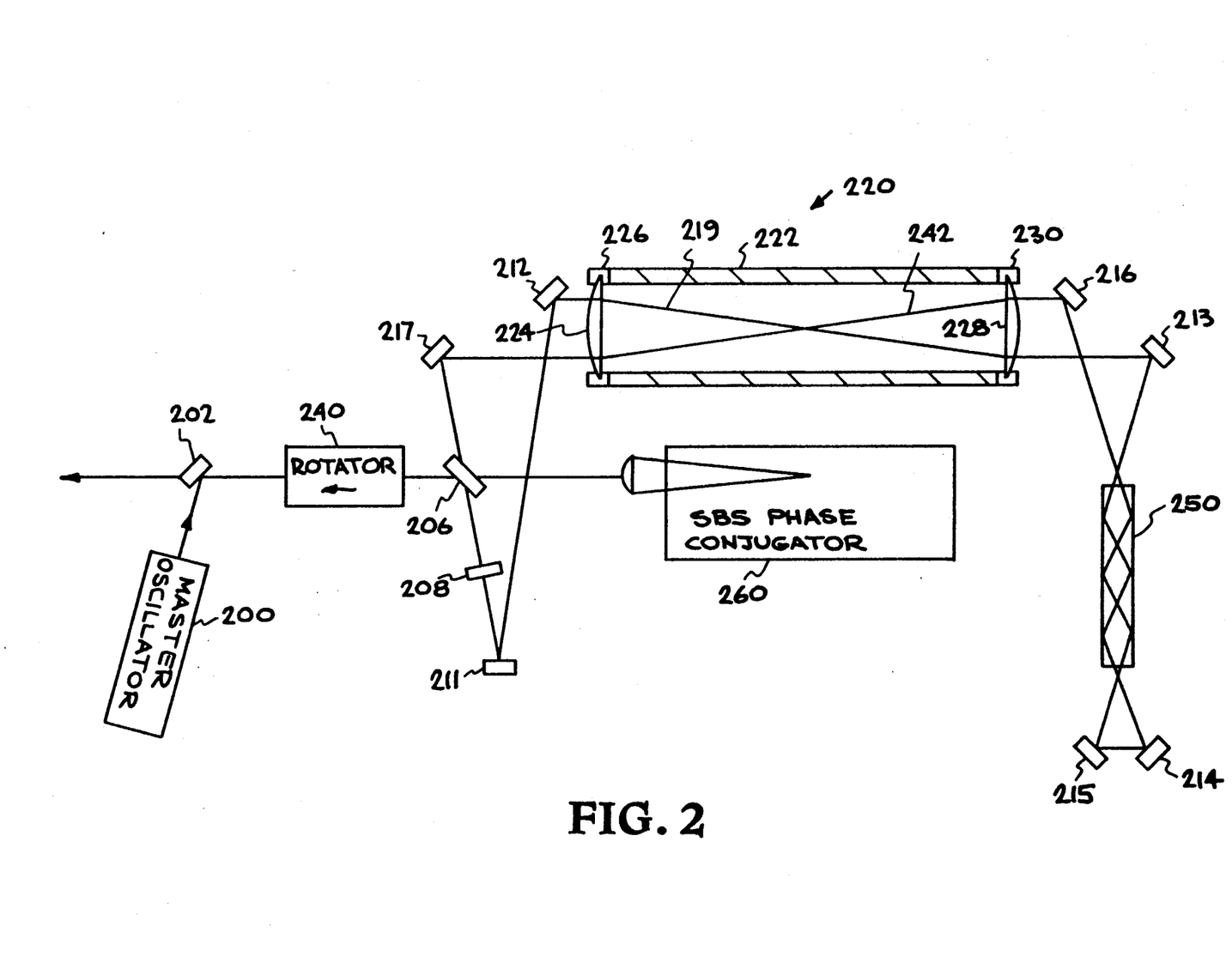
FIG. 2 is a schematic diagram of the regenerative laser amplifier according to the present invention.

FIG. 2 is a schematic diagram of the regenerative laser amplifier according to the present invention. The amplifier of FIG. 2, includes a master oscillator 200, a rotator 240, such as a Pockels cell or Faraday rotator, a relay telescope 220, a slab-shaped gain medium 250, and an SBS phase conjugator 260. The slab 250 is enclosed in a pump cavity (not shown). Two polarizers 202 and 206 are also included for capturing an input pulse, and extracting an output pulse. Seven flat, highly reflecting mirrors 211, 212, 213, 214, 215, 216, and 217, define an optical path through the slab 250, and telescope 220, and polarizer 206 connects the ring to SBS phase conjugator 260.

In operation, a master oscillator 200 supplies an input pulse which has S polarization. The pulse reflects off polarizer 202, proceeds through an isolation Pockels cell 240 remaining unchanged in polarization, and is further reflected off polarizer 206 into a ring shaped optical path defined by mirrors 211–217.

In the ring, the beam enters the 90 degree rotator 208 which rotates the beam by 90° to the P polarization. The pulse proceeds through mirrors 211 and 212 along optical path 219 through relay telescope 220.

The telescope 220 includes a vacuum chamber 222 having a first lens 224 mounted by a vacuum tight seal 226, and a second lense 228 mounted by vacuum tight seal 230. In an illustrative embodiment, each of the lenses 224 and 228 is a 1.2 meter focal length lense. The spacing between lenses 224 and 228 is approximately 2.4 meters adjusted so that the lense pair is afocal.

From telescope 220, the beam proceeds through mirror 213 into and through the slab 250 where it is reflected by mirrors 214 and 215 back through the slab 250. Near unity fill of the pumped volume is accomplished by a first zig-zag pass and a second zig-zag pass which are essentially mirror images about the direction of propagation. In this way, the second zig-zag pass will tend to extract gain from regions that may have been missed in the first pass.

From slab 250, the beam is reflected off mirror 216 along path 242 through telescope 220, off mirror 217 where it is reflected back into polarizer 206. Since the beam has been rotated by the 90 degree rotator 206 from the S polarization to the P polarization, the P polarized beam is transmitted by polarizer 206 to 90 degree rotator 208 to proceed through the ring a second time. However, during this second pass through the ring, 90 degree rotator rotates the polarization by 90° back to the S polarization. Therefore, when the beam reaches the polarizer 206 at the end of a second pass through the ring, it will be reflected into SBS phase conjugator 260.

The beam proceeding back out of the SBS phase conjugator, still having the S polarization, but reversed phase error will be reflected by polarizer 206 to mirror 217 where it will proceed along path 242 through telescope 220 to mirror 216. From mirror 216. From mirror 216, the beam will proceed through slab 250 a first time and be reflected back through the slab 250 a second time by mirrors 214 and 215. Proceeding out of slab 250, the beam will be reflected off mirror 213 and proceed back through telescope 220 and mirrors 212 and 211 to 90 degree rotator 208. The 90 degree rotator 208 will rotate the polarization by 90° back to the P polarization and transmit the beam to polarizer 206, thus completing a third pass through the ring, but this time in the reverse direction from the first two passes.

Since the beam has a P polarization, the beam will pass through polarizer 206 and proceed through the ring for a fourth pass through the ring, or a second pass in the reverse direction. At the end of this fourth pass through the ring, 90 degree rotator will rotate the polarization back to the S polarization causing the beam to reflect off of polarizer 206 out of the ring and into isolation Pockels cell 240. By this point, the net accumulated phase error is essentially zero. Isolation Pockels cell 240 or Faraday rotator will rotate the polarization of the beam to the P polarization enabling the beam to pass through polarizer 202 as a high energy output pulse.

Thus, the amplifier illustrated in FIG. 2 exhibits reduced diffraction, minimizing the likelihood of high peak perturbations in a beam, by utilizing two paths around the ring before entering the phase conjugator, and two equal and opposite paths around a ring after exiting the phase conjugator. The ring, further, utilizes a passive phase shifter instead of a Pockels cell. Additionally, all optical components are placed near the image planes by the use of two relay telescopes. The amplifier also exhibits higher gain to loss, with two slab passes per ring transit.

Each of the components of the amplifier of the present invention are described as follows.

Master Oscillator 200

The single frequency master oscillator 200 in FIG. 2 is implemented with a self seeding, Nd:YLF flash lamp pumped laser, derived from a self-seeded laser pumped laser concept for Nd:YLF described in U.S. Pat. No. 4,022,033, issued Jun. 4, 1991, by Lloyd Hackel. It generates an output pulse of approximately 50 millijoules at 10–50 hertz, in a single spatial mode $TEM_{00}$ and a single temporal mode at a wavelength near 1.053 micrometers. The output pulse beam of the master oscillator 200 has a diameter of approximately 3 mm.

Alternative oscillators which provide a pulse or series of pulses of high power laser radiation at consistent single frequency with good amplitude and temporal stability can be used.

Rotator Cell 240

The rotator 240 in one embodiment is implemented using a Pockels cell capable of handling up to one kilowatt average power in an aperture of 12 mm×140 mm. The electroactive material is potassium dihydrogen phosphate (KDP) with its deuterated isomorph, KD*P (greater than 93% deuterated). The deuterated isomorph is used to lower the optical absorption and obtain higher electro-optic coefficients. This Pockels cell is thermally compensated and designed according to the parameters described in Weaver, et al., "Multi Kilo-Watt Pockels Cell for High Average Power Laser Systems", J. Appl. Phys., 68 (6), Sep. 15, 1990, pp. 2589–2598. It is a 90° polarization rotator with no applied voltage. Other Pockels cell designs capable of meeting the average and peak power standards of the amplifier may be used. Also, the Pockels cell should have low loss, i.e., greater than 95% transmission. Further, a large aperture is required to sustain the large rectangular beam amplified by the slab 250. The damage threshold of greater than 4 joules per $cm^2$ for the pulse lengths generated is required. These parameters are met using KD*P plates manufactured by Cleveland Crystals, Inc., in Cleveland, Ohio.

In an alternative embodiment, the rotator 240 is implemented with a Faraday rotator, which requires no active switching. The Faraday rotator is configured for no rotation of a beam going in the input direction, and 90° rotation of a beam going in the output direction.

Polarizers 202 and 206

The polarizers 202 and 206 in FIG. 2 are thin film polarizers composed of high damage threshold material such as hafnia/silica in multiple layers, on a fused silica substrate. Such polarizers are commercially available from OCLI in Santa Rosa, Calif.

The coated faces of the polarizers 202 and 206 face the Pockels cell 240. The polarizers are mounted at Brewster's angle.

Polarizers 202 and 206 provide both an input coupling and an output coupling function. Alternative designs may use separate components for these functions.

Mirrors 211–217

All seven mirrors in the optical path of the embodiment of FIG. 2 are formed by flat, highly reflecting, high damage threshold mirrors manufactured with hafnia/silica coatings, with reflectivity near 99.9% at the wavelength of the amplifier.

Telescope 220

Figure 3:
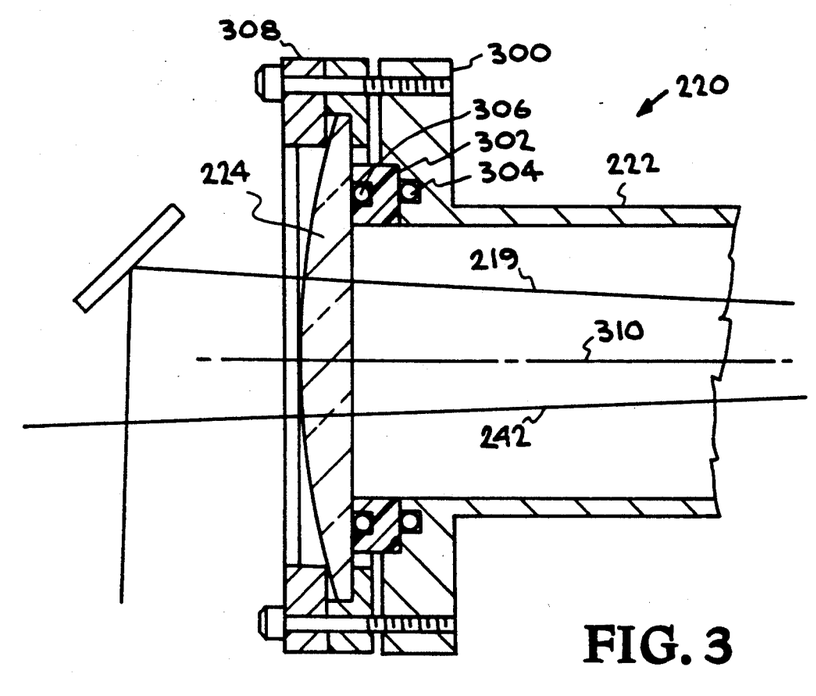
FIG. 3 is an expanded view of a lense mounted in the laser amplifier system shown in FIG. 2.

FIG. 3 is an expanded view of the end of the telescope 220 containing lense 224 as shown in FIG. 2. As can be seen, the telescope vacuum chamber 222 includes a flange 300. A lense mount spacer 302 (made of acetal thermoplastic, known in the trade as Delrin, or other suitable materials) is placed on flange 300 and sealed by O-ring 304. Lense 224 is placed adjacent to lense mount spacer 302 and sealed by O-ring 306. The lense 224 is mounted in a lense holder 308 exposing the outside surface of the lense to the beam.

In order to allow adjustment, the lense mount spacer 302 can be machined by mechanical shaving after experimental measurement of the focal lengths at low power. Using this technique, the lense pair is adjusted so that they are afocal.

Commercially available 25 cm high BK7 lenses are used, with 1.2 meter focal lengths. As can be seen, beams 219 and 242 proceed off axis 310 of the lenses. Using the 25 cm high lenses, a 1 cm wide × 10 cm high beam, slightly off axis, is transmitted with minimum distortion. Other size lenses could be used as suits the needs of a particular application. Also, materials such as fused silica may be used for the lense in order to improve the damage threshold, if necessary.

The vacuum chamber 222 is evacuated to approximately $10^{-4}$ torr, to prevent air breakdown at the focal point of the optical relays.

Slab 250

Figure 4:
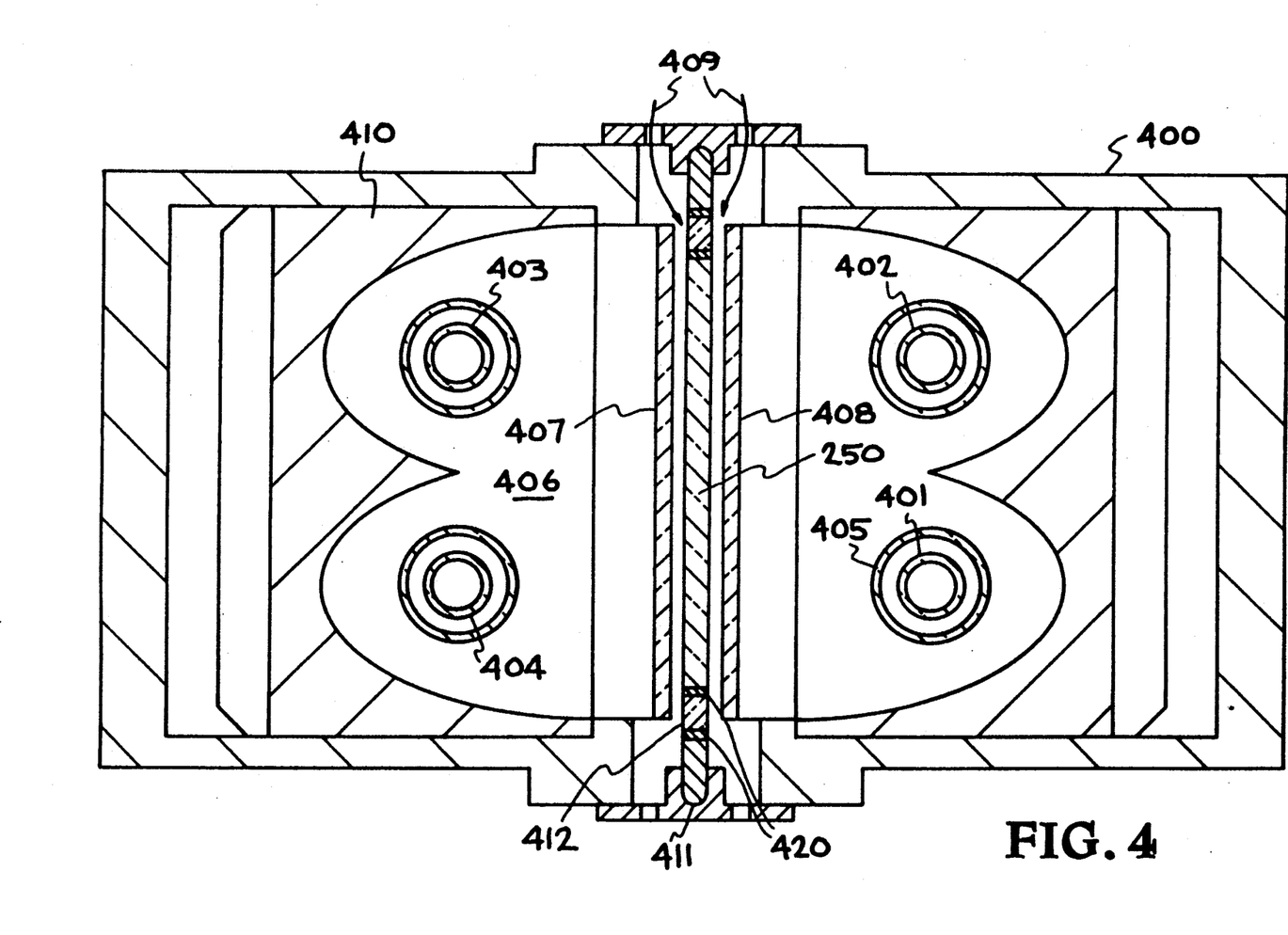
FIG. 4 is a schematic cross-section orthogonal to the optical path of the slab FIG. 2 and its enclosing pump cavity.
Figure 5:
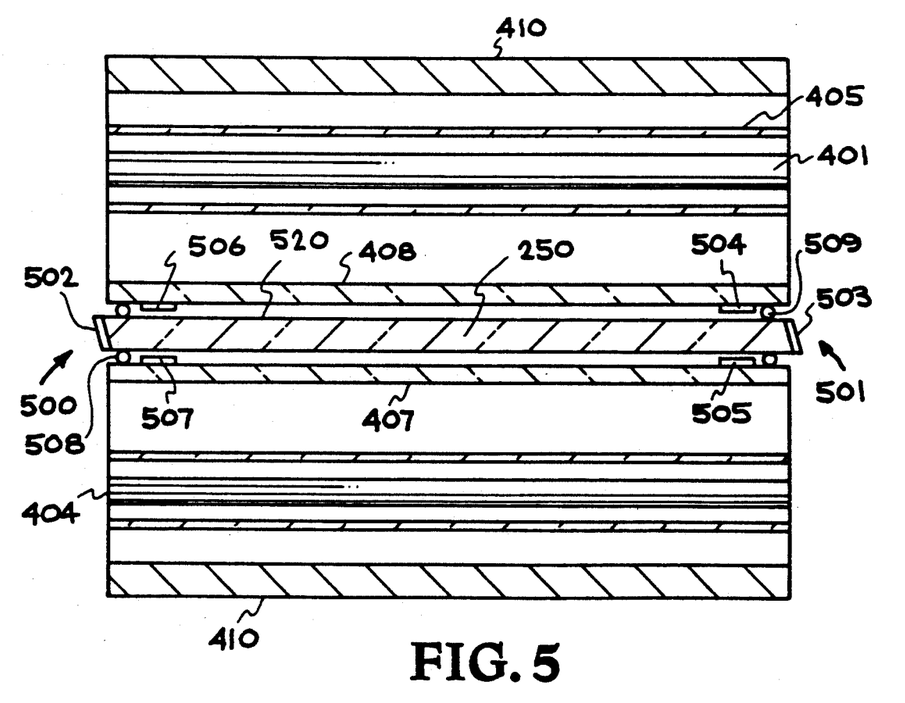
FIG. 5 is a schematic cross-section of the slab of FIG. 2 and enclosing pump cavity taken parallel to the optical path.

FIGS. 4 and 5 illustrates the slab 250 of FIG. 2 which is enclosed in a pump cavity. FIG. 4 is a schematic cross-section taken transverse to an optical path through slab 250, while FIG. 5 is a schematic cross-section taken parallel to the optical path.

As can be seen in FIG. 4, the slab 250 is mounted within a pump cavity 400 with 4 lamps 401, 402, 403, and 404. Lamps 401, 402, 403 404 are Xenon flash lamps mounted within respective coolant jackets (e.g., 405) as known in the art. These lamps are in turn mounted in a flooded reflector cavity 406. Plates of glass 407, 408 are mounted on each side of the slab 250 to establish a channel for the flow of cooling water in contact with the slab 250 as indicated at arrows 409. The flooded reflector cavity is encased by a diffuse reflector 410, such as a Spectralon (trademark) coated reflector which is commercially available from Labsphere, Inc. in North Sutton, N.H.

The slab 250 is secured to mounting bar 411 on each side. Between the mounting bar 411 is an absorbing glass plate 412 which absorbs the radiation subject to gain within the slab 250 to prevent parasitic oscillation transverse to the preferred optical path. Between the absorbing glass plate 412 and the slab 250, an index matching material 420 called Urapol 35-79X (manufactured by Dow Chemical Co., Sarnia, Ontario, Canada and available within the United States) is used to bond the slab 250 to the plate 412 and mounting bar 411. The Urapol serves to insulate the slab from heat absorbed in the glass 412, and prevent reflections at the interface between the slab and the mount.

Between the glass plates 407, 408 and the slab 250, a 1 mm gap is provided to allow flow of cooling water along path 409 on each side of the slab. Positive and negative pressure pumps on either side of the slab are used to maintain the water pressure on the slab at near atmospheric pressure, while establishing a turbulent flow of cooling water.

In the preferred system, the slab is a 10 mm × 140 mm × 419 mm slab of neodymium doped glass, doped in the range of 3 to $3.5 \times 10^{20}/cm^3$. Suitable glass materials include APG1 glass manufactured by Schott Glass in Duryea, Penn., or HAP4 from Hoya Optics in Fremont, Calif.

FIG. 5 is a schematic cross-section taken parallel to the optical path through the slab 250 of FIG. 2 which is enclosed in a pump cavity. It illustrates first that the input face 500 and the output face 501 of the slab are slightly wedged at 88.5° with respect to top surface 520 of slab 250 and parallel, to prevent parasitic oscillation within the slab. Additionally, the faces 500, 501 include anti-reflective coatings 502, 503, preferably manufactured of high tolerance multi-layer hafnia/silica, or other suitable materials such as Solgel available at Lawrence Livermore National Laboratory. Thus, the slab faces 500, 501 allow low loss transmission essentially independent of polarization. In particular, the slab can receive the pulse in either the P or S polarization as it transits around the optical path.

In addition, FIG. 5 illustrates a technique used to minimize perturbations generated in the slab. Because of the zig-zag optical path in the slab, there is a potential that different portions of the beam entering one face 500 may see different optical paths as they propagate through the slab. In order to ensure that the gain profile of all points along the beam are relatively uniform, shades formed by shims 504, 505, 506, 507 are mounted near the faces 500, 501 of the slab. These shims 504, 505, 506, 507 are used to tailor the length of the pump cavity relative to the slab, and ensure that the input and output shadows match. An alternative way of accomplishing this goal is to shorten the reflector flash lamp assembly so that the ends of the slab near faces 500, 501 are not illuminated. Shim widths are determined using computer modelling of the pump energy profile and optical paths within the slab. For a 10 mm thick slab having faces with 43° wedges, a tip to tip optical path length of 418.7 mm and a total of 10 internal reflections so that the incident angle at the entrance face is 56.74°, the pumped length of the slab is 326.6 mm.

Also, FIG. 5 illustrates the use of O-rings 508, 509 as water seals to enclose the cooling fluid between the slab and the glass plates 407, 408. Because of the positive and negative pressure pumps used to supply the cooling fluid, light O-ring pressure is sufficient to seal the pump cavity.

The glass in the flashlamp envelopes 401, and tubes, e.g., 405, are cerium doped glass to absorb ultraviolet radiation from the flashlamps and prevent solarization of the components in the pump cavity. Also, it may be desirable to dope the glass in the windows 407, 408 to absorb light with a wavelength shorter than about 400 nm.

The reflector illustrated in FIG. 4 is shaped according to a computer modelling based on the height of the slab, the number of flashlamps, the diameter of the plasma within the flashlamps, and the doping in the slab. This computer modelling generates an x-y position for the flashlamps and a shape for the reflector to achieve a substantially uniform pumping energy within the slab.

According to the computer modelling, the reflector contour is defined as follows.

Define the reflector contour f(x) based on the cubic:

$a = 9$ $b = -0.5$ $c = 0.5$ $d = -0.234375$

Original equation: $fo(x) = a + bx + cx^2 + dx^3$
Symmetry axes at $+-s$: $s = 3.2$
Half-aperture: $xmax = 7.2$ Composite reflector curve:
$x < -s: f(x) = fo(-x - s)$
$-s < x < o: f(x) = fo(x + s)$
$o < x < s: f(x) = fo(-x + s)$
$s < x: f(x) = fo(x - s)$ The lamp locations (at y=5.65 cm, and x=+/−3.8 cm) were arrived at by iterating variables to maximize source flatness at the slab plane.

This gain medium configuration having pulsed flash lamps establishes an effective gain lifetime within the slab on the order of a few hundred microseconds.

Using the passive Faraday rotator as the external isolation rotator, the input pulse may have a length on the order of the effective gain lifetime of a slab. In effect, the passive switching of the input beam into the optical path of the amplifier and out of the optical path of the amplifier allows a pulse of any desired length. This pulse length is only limited by the gain characteristics of the gain medium, pump source combination.

SBS Phase Conjugator 260

Design parameters for a stimulated Brillouin scattering (SBS) phase conjugator can be found in a variety of texts available to those skilled in the art. The conjugator can be made of a 20 cm long glass cell with quartz window. A 10 cm focal length lens is used to focus the input light in $CCl_4$ liquid filling the cell. Prior to use, the liquid is filtered through a fine 1 micrometer sized filter system. Many other liquids or gases can be used.

Conclusion

For applications such as X-ray lithography discussed above, 20 joules per pulse with a 5-7 nanosecond pulse at 3-10 hertz is required. This will result in the generation of 10mJ/cm² per pulse of X-rays at a target at a standoff of 20 cm, when used with iron oxide tape as the point source. The amplifier configuration of the present invention is well suited for such applications.

The present invention is capable of producing such high energies in part because it minimizes the number of lossy optical elements in the path of the high energy pulses, takes steps to reduce diffraction, takes steps to increase the gain to loss ratio of the amplifier and takes steps to minimize phase aberrations.

The components of the present invention as shown in FIG. 2 and as described above achieve reduced diffraction or phase perturbations by first utilizing two paths around the ring before entering the SBS phase conjugator 260 and two equal paths now with reversed phase around the ring in the opposite direction after exiting the SBS phase conjugator 260. The aberrations incurred in the first two amplifier passes are essentially identical to those incurred in the last two passes. However, since the conjugator reverses the phase of the first two passes, the accumulated phase error upon exit is zero.

Further, no active switching in the ring is required. Thus, the pulse length is limited only by the input and output coupling. Using a Pockels cell as the input isolation rotator, the effective pulse length is limited by four times the ring length less the distance travelled during the time the Pockels cell switches. With the passive isolation rotator, such as one based on the Faraday rotator, an input pulse of any desired length may be used. Thus, the amplifier configuration of the present invention allows high power, high beam quality, and long pulse lengths in a combination not achieved in the prior art.

Another advantage is the placement of components near the telescope 220 which involves, in effect, two relay telescopes, one to relay a pulse to the slab 250 and one to relay a pulse from the slab 250. Using the telescope 220 reduces diffraction caused by the significant distances between mirrors in the telescope of FIG. 1.

Additionally, a beam path is utilized enabling at least two passes through the slab 250 for each transit of the optical path improving the gain to loss ratio of the ring. Furthermore, the slab 250 includes first and second faces transverse to the optical path which permit transmission of light substantially independent of the polarization. This configuration allows for near unity fill of the slab, and thus, efficient extraction.

In the amplifier system of the present invention an input beam having a diffraction limited quality generates an amplified signal having nearly the same diffraction limited quality. Measured results show substantially no degradation of diffraction limited quality through the amplifier.

Although the invention has been described above with particularity, this was merely to teach one of ordinary skill in the art how to make and use the invention. Many modifications will fall within the scope of the invention, as that scope is defined by the following claims.

What is claimed is:

1. A laser amplifier, comprising:
   a gain medium;
   a polarization rotator;
   a passive polarizer;
   a plurality of reflectors configured to define an optical path through the gain medium, the passive polarizer, and the polarization rotator; and
   a phase conjugator configured to receive a beam from the optical path after the pulse has proceeded one or more transits through the optical path, the phase conjugator further configured to return the beam with reversed phase to the optical path to proceed an equal number of transits of the optical path in an opposite direction before exiting the optical path;
   wherein a transit of the beam through the optical path includes a plurality of passes through the gain medium and only one pass through the polarization rotator and the passive polarizer.

2. The laser amplifier of claim 1, wherein the plurality of passes through the gain medium compsises two zigzag passes which in combination accomplish near unity fill of the gain medium.

3. The laser amplifier of claim 1 wherein the polarization rotator rotates the pulse by 90 degrees during each transit through the optical path.

4. The laser amplifier of claim 1 wherein the phase conjugator is a stimulated Brillouin scattering phase conjugator.

5. The laser amplifier of claim 1 further comprising:

means for generating the beam with a first polarization;

an external polarizer reflecting the beam from the generating means with the first polarization, but transmitting a beam with a second polarization; and an external polarization rotator which receives the beam reflected from the external polarizer and transmits the pulse with no polarization change into the optical path, and which receives the beam exiting the optical path and rotates the beam to the second polarization so that the beam will proceed through the external polarizer as an amplified output pulse.

6. The laser amplifier of claim 5 wherein the external polarization rotator includes an isolation Pockels cell.

7. The laser amplifier of claim 5 wherein the external polarization rotator includes an isolation Faraday rotator.

8. The laser amplifier of claim 1 further comprising a source of pump energy coupled with the gain medium.

9. The laser amplifier of claim 8, wherein the gain medium comprises a slab, and the source of pump energy comprises a pump cavity, enclosing the slab, and supplying a substantially uniform pump energy distribution in the slab to minimize perturbations in the beam.

10. The laser amplifier of claim 8, wherein the gain medium comprises a slab consisting of Nd:glass, and the source of pump energy comprises a pump cavity, enclosing the slab, and supplying a substantially uniform pump energy distribution in the slab to minimize perturbations in the beam.

11. The laser amplifier of claim 1, wherein the gain medium includes first and second faces transverse to the optical path, and wherein the first and the second faces permit transmission of the pulse through the gain medium substantially independent of polarization.

12. The laser amplifier of claim 11, wherein the first and second faces of the gain medium have anti-reflective coatings.

13. The laser amplifier of claim 1, further comprising two telescopes mounted in the optical path, one for relaying an image adjacent the gain medium to a location adjacent the polarization rotator and the passive polarizer, and another for relaying the image back.

14. The laser amplifier of claim 11, wherein the telescope comprises a vacuum chamber, a first lense mounted with a vacuum tight seal at a first end of the vacuum chamber, and a second lense mounted with a vacuum tight seal at a second end of the vacuum chamber, and wherein the first and second lenses are mounted so that the optical path proceeds slightly off axis through the lenses so that the first and second lenses form the two telescopes.

15. The laser amplifier of claim 1, wherein the passive polarizer comprises an optical element mounted transverse to the optical path, and having first and second faces at near Brewster's angle reflecting a beam with a first polarization and transmitting a beam having a second polarization orthogonal to the first polarization.

16. The laser amplifier of claim 5 wherein the amplified output beam includes pulses with energy greater than 20 joules per pulse and peak power greater than a gigawatt.

17. The laser amplifier of claim 5 wherein when a beam from the generating means has a diffraction limited quality, and the amplified output pulse has substantially the same diffraction limited quality.

18. The laser amplifier of claim 1 wherein the beam includes pulses having a length more than one times a length of the optical path.

19. A laser amplifier capable of amplifying a laser pulse to a magnitude capable of generating X-rays used in the process of X-ray lithography for manufacturing integrated circuits, the amplifier comprising:

means for generating an input beam;

a gain medium;

a first polarization rotator;

a passive polarizer;

a plurality of reflectors configured to define an optical path through the gain medium, the passive polarizer, and the first polarization rotator;

a phase conjugator configured to receive a beam from the optical path after the beam has proceeded one or more transits through the optical path, the phase conjugator further configured to return the beam with reversed phase to the optical path to proceed an equal number of transits of the optical path in an opposite direction before exiting the optical path;

an external polarizer reflecting the beam from the generating means, the beam having a first polarization, but transmitting a beam with a second polarization; and a second polarization rotator which receives the beam reflected from the external polarizer and transmits the beam with no polarization change into the optical path, and which receives the beam exiting the optical path and rotates the beam to the second polarization so that the beam will proceed through the external polarizer as an amplified output beam;

wherein a transit of the beam through the optical path includes a plurality of passes through the gain medium and only one pass through the polarization rotator and the passive polarizer.

20. A method of amplifying a laser beam comprising the steps of:

coupling a beam into a ring shaped optical path;

phase reversing the beam after one or more transits through the ring;

coupling passively the beam out of the ring after an equal number of transits through the ring in an opposite direction; and increasing gain twice for each transit of the beam through the ring.

21. A laser amplifier, comprising:

a gain medium, including a source of pump energy, having an effective gain lifetime;

means, mounted with the gain medium, for establishing an optical path having path length including more than two passes through the gain medium within the effective gain lifetime of the gain medium; and means, mounted with the gain medium, for coupling a beam into the optical path and out of the optical path, wherein the beam has a pulse length greater than the path length of the optical path;

wherein the means for establishing an optical path includes:

a plurality of reflectors configured to establish a ring in which each transit of the ring includes more than one pass through the gain medium, and a phase conjugator configured to receive a pulse from the optical path after the pulse has proceeded one or more transits through the ring, the phase conjugator further configured to return the pulse to the ring to proceed an equal number of transits in an opposite direction before completing the optical path.

22. The laser amplifier of claim 21, wherein the means for coupling the beam into and out of the optical path includes:
    an external polarizer reflecting a beam from a beam source with a first polarization, but transmitting a beam with a second polarization; and
    an external polarization rotator which receives the beam reflected from the external polarizer and transmits the beam with no polarization change into the optical path, and which receives the beam from the optical path and rotates the beam to the second polarization so that the beam will proceed through the external polarizer as an amplified output beam.

23. A laser amplifier, comprising:
    a gain medium, including a source of pump energy, having an effective gain lifetime;
    means, mounted with the gain medium, for establishing an optical path having path length including more than two passes through the gain medium within the effective gain lifetime of the gain medium; and
    means, mounted with the gain medium, for coupling a beam into the optical path and out of the optical path, wherein the beam has a pulse length greater than the path length of the optical path;
    wherein the means for coupling the beam into and out of the optical path includes:
    an external polarizer reflecting a beam from a beam source with a first polarization, but transmitting a beam with a second polarization; and
    an external polarization rotator which receives the beam reflected from the external polarizer and transmits the beam with no polarization change into the optical path, and which receives the beam from the optical path and rotates the beam to the second polarization so that the beam will proceed through the external polarizer as an amplified output beam.

24. A laser amplifier, comprising:
    a gain medium;
    a polarization rotator;
    a passive polarizer;
    a plurality of reflectors configured to define an optical path through the gain medium, the passive polarizer, and the polarization rotator; and
    a phase conjugator configured to receive a beam from the optical path after the pulse has proceeded one or more transits through the optical path, the phase conjugator further configured to return the beam with reversed phase to the optical path to proceed an equal number of transits of the optical path in an opposite direction before exiting the optical path;
    wherein the gain medium includes first and second faces transverse to the optical path, and wherein the first and the second faces permit transmission of the pulse through the gain medium substantially independent of polarization;
    wherein the first and second faces of the gain medium have anti-reflective coatings.

25. A laser amplifier, comprising:
    a gain medium;
    a polarization rotator;
    a passive polarizer;
    a plurality of reflectors configured to define an optical path through the gain medium, the passive polarizer, and the polarization rotator; and
    a phase conjugator configured to receive a beam from the optical path after the pulse has proceeded one or more transits through the optical path, the phase conjugator further configured to return the beam with reversed phase to the optical path to proceed an equal number of transits of the optical path in an opposite direction before exiting the optical path;
    a means for generating the beam with a first polarization;
    an external polarizer reflecting the beam from the generating means with the first polarization, but transmitting a beam with a second polarization; and
    an external polarization rotator which receives the beam reflected from the external polarizer and transmits the pulse with no polarization change into the optical path, and which receives the beam exiting the optical path and rotates the beam to the second polarization so that the beam will proceed through the external polarizer as an amplified output pulse;
    wherein the amplified output pulses have energy greater than 20 joules per pulse and peak power greater than a gigawatt.

26. The laser amplifier of claim 23, wherein the external polarization rotator comprises a Faraday rotator.

* * * * *